United States Patent
Gosling et al.

(10) Patent No.: US 11,431,990 B2
(45) Date of Patent: Aug. 30, 2022

(54) VIDEO COMPRESSION WITH INCREASED FIDELITY NEAR HORIZON

(71) Applicant: Thales Holdings UK Plc, Nr Weybridge (GB)

(72) Inventors: Paul Gosling, Stockport (GB); Stephen Sykes, Reading (GB)

(73) Assignee: THALES HOLDINGS UK PLC, Berkshire (GB)

(*) Notice: Subject to any disclaimer, the term of this patent is extended or adjusted under 35 U.S.C. 154(b) by 613 days.

(21) Appl. No.: 15/173,081

(22) Filed: Jun. 3, 2016

(65) Prior Publication Data
US 2016/0360209 A1 Dec. 8, 2016

(30) Foreign Application Priority Data

Jun. 4, 2015 (GB) ..................... 1509706

(51) Int. Cl.
| | |
|---|---|
| *H04N 19/167* | (2014.01) |
| *H04N 19/17* | (2014.01) |
| *H04N 19/124* | (2014.01) |
| *H04N 19/625* | (2014.01) |

(52) U.S. Cl.
CPC ......... *H04N 19/167* (2014.11); *H04N 19/124* (2014.11); *H04N 19/17* (2014.11); *H04N 19/625* (2014.11)

(58) Field of Classification Search
None
See application file for complete search history.

(56) References Cited

U.S. PATENT DOCUMENTS

| | | |
|---|---|---|
| 5,452,104 A | 9/1995 | Lee |
| 5,576,767 A | 11/1996 | Lee et al. |
| 5,792,147 A | 8/1998 | Evans et al. |
| (Continued) | | |

FOREIGN PATENT DOCUMENTS

| | | |
|---|---|---|
| AT | 247361 T | 8/2003 |
| AU | 1537401 A | 6/2001 |
| (Continued) | | |

OTHER PUBLICATIONS

Zhang et al., "Satellite Recognition and Pose Estimation Using Homeomorphic Manifold Analysis," IEEE Trans. Aerosp. Electron. Syst., Jan. 2015.*

(Continued)

*Primary Examiner* — Michael J Hess
(74) *Attorney, Agent, or Firm* — Hauptman Ham, LLP (57) ABSTRACT

A device and method for compressing image data. Image data is received comprising one or more images recorded by a camera. Attitude data is received indicating the attitude of the camera when each of the one or more images was recorded. In each of the one or more images, a region of interest is defined, the region of interest being bounded by a boundary, the boundary of the region of interest being based on the attitude data for the respective image and defining a section of the image within the region of interest and a section of the image outside the region of interest. Each of the one or more images is compressed, wherein the compression ratio applied to the section of the image outside the region of interest is higher than that applied to the section of the image within the region of interest.

16 Claims, 6 Drawing Sheets

(56) References Cited

U.S. PATENT DOCUMENTS

| | | | |
|---|---|---|---|
| 6,359,617 B1* | 3/2002 | Xiong | G06T 3/0068 |
| | | | 715/848 |
| 6,844,895 B1 | 1/2005 | Billerbeck et al. | |
| 6,926,673 B2 | 8/2005 | Roberts et al. | |
| 7,064,489 B2 | 6/2006 | Price | |
| 7,071,853 B2 | 7/2006 | Price | |
| 7,295,228 B2 | 11/2007 | Roberts et al. | |
| 7,826,834 B2 | 11/2010 | Hook et al. | |
| 7,864,980 B2 | 1/2011 | Evans | |
| 8,073,973 B2 | 12/2011 | McCann et al. | |
| 8,275,170 B2 | 9/2012 | Lee et al. | |
| 2002/0021353 A1 | 2/2002 | DeNies | |
| 2002/0054223 A1 | 5/2002 | Spriggs | |
| 2002/0062482 A1 | 5/2002 | Bolle et al. | |
| 2003/0026588 A1 | 2/2003 | Elder et al. | |
| 2003/0095183 A1 | 5/2003 | Roberts et al. | |
| 2004/0051653 A1 | 3/2004 | Price | |
| 2004/0075596 A1 | 4/2004 | Price | |
| 2004/0091158 A1 | 5/2004 | Miled et al. | |
| 2004/0100557 A1 | 5/2004 | Roberts et al. | |
| 2006/0239673 A1 | 10/2006 | Mansbridge | |
| 2007/0188734 A1 | 8/2007 | Waquet | |
| 2008/0137960 A1 | 6/2008 | Lee et al. | |
| 2009/0154565 A1 | 6/2009 | Jeong et al. | |
| 2010/0045800 A1 | 2/2010 | Chebil et al. | |
| 2010/0082281 A1* | 4/2010 | Nakamura | G06T 7/80 |
| | | | 702/95 |
| 2010/0172404 A1 | 7/2010 | Isnardi et al. | |
| 2010/0172546 A1* | 7/2010 | Sharp | G01B 11/26 |
| | | | 382/106 |
| 2010/0245576 A1* | 9/2010 | Inui | G06T 7/0018 |
| | | | 348/148 |
| 2011/0267452 A1 | 11/2011 | Notsu et al. | |
| 2012/0169842 A1 | 7/2012 | Chuang et al. | |
| 2013/0144162 A1* | 6/2013 | Anquez | A61B 8/485 |
| | | | 600/438 |
| 2014/0176542 A1* | 6/2014 | Shohara | G06T 15/205 |
| | | | 345/420 |
| 2015/0235101 A1* | 8/2015 | Belman | G06K 9/4647 |
| | | | 348/222.1 |
| 2015/0235432 A1* | 8/2015 | Bronder | G06T 19/006 |
| | | | 345/633 |
| 2015/0323648 A1* | 11/2015 | Haglund | G01C 21/20 |
| | | | 701/4 |
| 2016/0165233 A1* | 6/2016 | Liu | G06T 11/60 |
| | | | 382/251 |
| 2016/0212405 A1* | 7/2016 | Zhang | H04N 13/0048 |

FOREIGN PATENT DOCUMENTS

| | | |
|---|---|---|
| AU | 200115374 A5 | 6/2001 |
| AU | 2001293963 B2 | 9/2001 |
| AU | 5043001 A | 4/2002 |
| AU | 7057501 A | 4/2002 |
| AU | 9396301 A | 4/2002 |
| AU | 200170575 A5 | 4/2002 |
| AU | 200222102 A5 | 6/2002 |
| AU | 2002222102 | 6/2002 |
| AU | 2003254437 A1 | 7/2003 |
| CA | 2372029 A1 | 11/2000 |
| CA | 2423741 A1 | 4/2002 |
| CN | 1214562 C | 8/2005 |
| CN | 1251151 C | 4/2006 |
| CN | 1262972 C | 7/2006 |
| CN | 100389613 C | 5/2008 |
| CZ | 20022116 A3 | 11/2002 |
| DE | 20019297 U1 | 5/2001 |
| DE | 102010040948 A1 | 4/2012 |
| EP | 0672389 A2 | 9/1995 |
| EP | 1189021 A1 | 3/2002 |
| EP | 1224800 | 7/2002 |
| EP | 1245115 | 8/2003 |
| EP | 1173990 | 10/2003 |
| EP | 1348002 | 8/2006 |
| EP | 1320832 | 4/2007 |
| EP | 1320833 | 12/2008 |
| EP | 1529268 | 8/2013 |
| GB | 2287598 A | 9/1995 |
| GB | 2316255 A | 2/1998 |
| GB | 2337173 A | 11/1999 |
| GB | 2344009 A | 5/2000 |
| GB | 2345779 A | 7/2000 |
| GB | 2348787 A | 10/2000 |
| GB | 2349548 A | 11/2000 |
| GB | 2354394 A | 3/2001 |
| GB | 2355891 A | 5/2001 |
| GB | 2357207 A | 6/2001 |
| GB | 2367459 A | 4/2002 |
| GB | 2367460 A | 4/2002 |
| GB | 2368219 A | 4/2002 |
| GB | 2370479 A | 6/2002 |
| GB | 2370945 A | 7/2002 |
| GB | 2370946 A | 7/2002 |
| GB | 2371175 A | 7/2002 |
| GB | 2371176 A | 7/2002 |
| GB | 2373388 A | 9/2002 |
| GB | 2375923 A | 11/2002 |
| GB | 2377597 A | 1/2003 |
| GB | 2378361 A | 2/2003 |
| GB | 2380883 A | 4/2003 |
| GB | 2392033 A | 2/2004 |
| GB | 2399472 A | 9/2004 |
| GB | 2408402 A | 5/2005 |
| GB | 2432274 A | 5/2007 |
| GB | 2466039 A | 6/2010 |
| GB | 2528246 A | 1/2016 |
| GB | 2535708 A | 8/2016 |
| JP | 2007174477 A | 7/2007 |
| JP | 2007192988 A | 8/2007 |
| JP | 2007207191 A | 8/2007 |
| JP | 2007233542 A | 9/2007 |
| JP | 2008236390 A | 10/2008 |
| JP | 2010092138 A | 4/2010 |
| KR | 100820630 B1 | 4/2008 |
| WO | 0062490 | 10/2000 |
| WO | 0065855 | 11/2000 |
| WO | 0126765 A1 | 4/2001 |
| WO | 0133836 A1 | 5/2001 |
| WO | 0141884 A1 | 6/2001 |
| WO | 0145415 A1 | 6/2001 |
| WO | 0226860 A1 | 4/2002 |
| WO | 0227663 A1 | 4/2002 |
| WO | 0227664 A1 | 4/2002 |
| WO | 0244749 A1 | 6/2002 |
| WO | 02058329 A2 | 7/2002 |
| WO | 03007572 A1 | 1/2003 |
| WO | 03015284 A1 | 2/2003 |
| WO | 2004017273 A1 | 2/2004 |
| WO | 2004082265 A1 | 9/2004 |
| WO | 2005055603 A1 | 6/2005 |
| WO | 2007054742 A1 | 5/2007 |
| WO | 2010067091 A1 | 6/2010 |
| WO | 2010112894 A1 | 10/2010 |
| WO | 2011/004358 A1 | 1/2011 |
| WO | 2012034973 A1 | 3/2012 |
| WO | 2013/171746 A1 | 11/2013 |

OTHER PUBLICATIONS

Puig et al., "Scale Space for Central Catadioptric Systems: Towards a Generic Camera Feature Extractor," IEEE International Conference on Computer Vision, 2011.*

Zhang et al., "Joint Object and Pose Recognition using Homeomorphic Manifold Analysis," AAAI, 2013a.*

Extended European Search Report dated Jul. 7, 2016 in European Patent Application No. 16172730.0.

Maleh, Ray et al.: "Geospatial processing of registered H.264 data",Geospatial Infofusion II, SPIE, 1000 20th St. Bellingham WA 98225-6705 USA, vol. 8396, No. 1, May 11, 2012, pp. 1-13, P060002413, DOI: 10.1117/12.918593.

Belyaev, Evgeny et al.: "The Use of Automotive Radars in Video-Based Overtaking Assistance Applications", IEEE Transactions on

(56) References Cited

OTHER PUBLICATIONS

Intelligent Transportation Systems, IEEE, Piscataway, NJ, USA, vol. 14, No. 3, Sep. 1, 2013 (Sep. 1, 2013), pp. 1035-1042, XP011525559, ISSN: 1524-9050, DOI: 10.1109/TITS.2013.2248731.

Rakesh, Kumar et al.: "Aerial Video Surveillance and Exploitation", Proceedings of the IEEE, IEEE. New York, US, vol. 89, No. 10, Oct. 1, 2001 (Oct. 1, 2001), XP011044566, ISSN: 0018-9219.

"Real-time Video Stabilization For Moving Platforms", Eddy Vermeulen dated Apr. 7, 2001 (https://www.researchgate.net/publication/228913772_Real-time_Video_ Stabilization_For _Moving_ Piatforms).

Combine User Defined Region-of-Interest and Spatial Layout for Image Retrieval, Qi Tian, et al. dated Sep. 10, 2000 (http://citeseerx.ist.psu.edu/viewdoc/download?doi=10.1.1.64.148&rep=rep1&type=pdf).

Context modeling combined with motion analysis for moving ship detection in port surveillance, Xinfeng Bao; Solmaz Javanbakhti; Svitlana Zinger; Rob Wijnhoven; Peter H. N. de With, J. Electron. Imaging. 22(4), 041114 (Aug. 30, 2013).

Horizon Line Detection in Marine Images: Which Method to Choose? Evgeny Gershikov, Tzvika Libe, and Samuel Kosolapov dated Jan. 1, 2013 (https://www.thinkmind.org/download.php?articleid=intsys_v6_n12_2013_7).

Low-Complexity Transform and Quantization in H.264/AVC, Henrique S. Malvar et al., IEEE Transactions on Circuits and Systems for Video Technology, vol. 13, No. 7, Jul. 1, 2003.

Overview of the H.264/AVC Video Coding Standard; Thomas Wiegand, et al., IEEE Transaction on Circuits and Systems for Video Technology, vol. 13, No. 7, Jul. 1, 2003.

Recent Advances in Region-of-interest Video Coding, Dan Greis, Ofer Hadar, May 7, 2011, (http://www.hindawi.com/journals/am/2013/281593/).

Region-of-interest-based algorithm for automatic target detection in infrared images, Shlomo Greenberg, et al., dated Jul. 4, 2005 (http://opticalengineering.spiedigitallibrary.org/article.aspx?articleid=1101261&resultCiick=1).

Tracking Ships from Fast Moving Camera through Image Registration; Sergiy Fefilatyev; Univ. of South Florida, FL, USA; Dmitry Goldgof; Chad Lembke; Pattern Recognition (ICPR), 2010 20th International Conference on (p3500-3503); Aug. 23-26, 2010.

Variable Size Block Matching Motion Compensation with Applications to Video Coding, M.H. Chan et al., IEE Proceedings, vol. 137, Pt 1, No. 4 (Aug. 1, 1990).

* cited by examiner

VIDEO COMPRESSION WITH INCREASED FIDELITY NEAR HORIZON

FIELD OF THE INVENTION

Embodiments of the invention relate generally to a device and method for compression with increased fidelity within a movable region of interest.

BACKGROUND

When storing or transmitting image or video data it is commonplace to compress the data to reduce the number of bits that are required to be transmitted or stored. Compression often results in a loss of information which in some circumstances may degrade the data to an unacceptable level. Many images or video streams contain one or more regions in the frame or image which are of greater importance than the remaining area. For instance, in the case of surveillance or security footage, a certain region being viewed (such as a shop entrance) may be of greater interest, whereas other areas within the frame (such as the ceiling) may be of less importance. Applying the same compression ratio across the whole image or frame of the video feed can either result in excessive image degradation within a region of interest or an insufficient bit-rate reduction due to unnecessary image fidelity outside of the region of interest.

BRIEF DESCRIPTION OF THE DRAWINGS

Embodiments of the present invention will be understood and appreciated more fully from the following detailed description, made by way of example only and taken in conjunction with drawings in which.

DETAILED DESCRIPTION

To allow an image or a frame from a video feed to be compressed to a higher degree whilst also maintaining fidelity within a region of interest, embodiments of the present invention apply different levels of compression across the image. A higher level of compression is applied outside of the region of interest whilst a lower level of compression is applied within the region of interest. The compression system therefore provides greater image fidelity within the region of interest than outside the region of interest.

Applying a reduced compression ratio within a region of interest is of particular use in the field of unmanned surface vehicles where the primary area of interest is the horizon. An unmanned surface vehicle is a ship, boat or other vehicle which operates on the surface of the water without a local operator. Accordingly, one or more cameras are required to help the operator remotely control the vehicle. The video has to be transmitted to the operator and, in order to meet bandwidth constraints, the image has to be compressed. In addition, where there is a large fleet of unmanned vehicles, compression becomes increasingly important due to bandwidth constraints associated with transmitting and receiving a large amount of video data.

The most important area in a video feed from a camera on a ship is the horizon as this is where land masses and other vessels mostly appear. Having said this, the horizon is likely to move around the screen as the vessel (and therefore the camera attached to the vessel) pitches and rolls on the sea. In this case, either a very large region of interest is used in order to ensure that the part of the scene which is of interest (in this case, the horizon) remains within the region of interest and therefore a reduced compression ratio is achieved, or a smaller region of interest is used risking the object moving out of the region of interest and into a region of lower fidelity. Accordingly, a region of interest which is fixed within the frame of the video feed is not appropriate in situations where a large amount of camera motion is likely.

Image processing techniques may be used to determine the location of the horizon (or any other relevant object of interest) in order to dictate the position of the region of interest; however, this may not be effective in low light conditions or poor light conditions in which it may be difficult to discern the horizon or where parts of the horizon are obscured by land or other objects of lesser concern.

Accordingly, there is a need for an improved method of compressing image and video data in order to accommodate situations in which a large amount of camera motion is expected.

Accordingly, embodiments of the present invention provide a means of computing the position of the region of interest in the image based on the attitude of the camera to accommodate for camera motion. In one embodiment, this is achieved by defining the region of interest as a region fixed on a sphere encircling the camera. The sphere is fixed in relation to the compass points (north, east, south, west, etc.). Accordingly, the sphere is also fixed in relation to the local horizontal plane. The region of interest therefore remains fixed around a particular direction regardless of the attitude of the camera. Embodiments of the invention use the attitude of the camera to apply a transform to convert the region of interest defined on the sphere into a region of interest defined in terms of pixel coordinates within the field of view of the camera. In this manner the rotation of the camera is compensated such that the region of interest in the image follows the object of interest in the world. This allows the region of interest in the image to be transformed to compensate for camera motion.

In one embodiment, the region of interest is defined as a two-dimensional shape on the surface of a sphere, or on any two dimensional manifold that is capable of being mapped to all or part of the sphere. This two-dimensional surface is embedded within a three-dimensional reference coordinate system. The reference coordinate system is substantially co-centric with the camera coordinate system, and has an orientation that is arbitrary but known with respect to the camera coordinate system. The camera coordinate system is centred on the camera and is carried by it. Without loss of generality, if a sphere is used as the two dimensional manifold, it may be a unit sphere. This allows the boundary to be defined in terms of unit vectors.

According to a first aspect of the invention there is provided a device for compressing image data. The device comprises a controller configured to receive image data comprising one or more images recorded by a camera, receive attitude data indicating the attitude of the camera when each of the one or more images was recorded, in each of the one or more images, define a region of interest bounded by a boundary, the boundary of the region of interest being based on the attitude data for the respective image and defining a section of the image within the region of interest and a section of the image outside the region of interest, and compress each of the one or more images, wherein the compression ratio applied to the section of the image outside the region of interest is higher than that applied to the section of the image within the region of interest.

By defining the boundary of the region of interest in the image based on attitude data for the image, embodiments of the invention allow the region of interest to be altered to accommodate for camera movement. Embodiments therefore allow the fidelity of less important sections of an image to be reduced in order to provide an increased compression of the image, whilst also ensuring that the region of interest continues to encompass the most important section of the image even when the attitude of the camera has changed. This may apply to a single image taken by a camera with a predefined region of interest and accompanying attitude data. Alternatively, this may be applied to video data, with each image in the video feed having a region of interest adapted based on its respective attitude data.

Applying a higher compression ratio to the image outside of the region of interest may involve compressing the whole image, with a higher compression ratio being applied outside the region of interest, or only compressing the section of the image outside the region of interest. Accordingly, in one embodiment the controller is configured to compress, for each image, only the section of the image outside the region of interest.

Attitude data may include data indicating one or more of the pitch, yaw and/or roll of the camera. The attitude data may be measured by an attitude sensor attached to the camera, or attached to any object whose orientation relative to the camera is known, such as a surface vessel upon which the camera is mounted. The attitude data may comprise data specifying the attitude of an attitude sensor as well as data specifying the attitude of the camera relative to the attitude sensor. The data specifying the attitude of the camera relative to the attitude sensor may be stored in memory and received by the controller to be used to determine the attitude of the camera based on the data specifying the attitude of the sensor.

In one embodiment, defining the region of interest in each of the one or more images comprises transforming the boundary of the region of interest defined in a reference coordinate system into the boundary of the region of interest within the respective image based on the attitude data for the image. The region of interest in the reference coordinate system may be defined as the region lying within a set of planes defined in the reference coordinate system.

The reference coordinate system may be a local level coordinate system. In one embodiment, the reference coordinate system is concentric with the optical centre of the camera and is fixed with respect to compass points and with respect to the local horizontal plane. In one embodiment, the reference coordinate system has axes aligned with East, North and Up and has its origin at the optical centre of the camera. The reference coordinate system is therefore independent of the attitude of the camera.

The attitude data can then be used to transform the boundary of the region of interest defined in the reference coordinate system into a boundary in the coordinate system of the image. In a further embodiment, the boundary of the region of interest is defined in the reference coordinate system on a two dimensional manifold which is carried by the reference coordinate system. This provides a stable reference boundary upon which subsequent transformations may be based. The coordinate system of the image may be a two dimensional coordinate system representing fixed positions within the image. This may be row and column indices representing pixel locations or any other suitable coordinate system.

Whilst the reference coordinate system may be centred on the optical centre of the camera, it may also be centred on another object attached to the camera, such as an attitude sensor or a boat upon which the camera is mounted.

The predefined region of interest may be input, for instance, by a user via an input interface, or may be determined by the controller based on image processing methods such as object recognition or edge detection. The predefined region of interest may be defined either as a region in an image, (such as in the 2D coordinates of the image) or as a region in the reference coordinate system (such as 3D polar coordinates or Cartesian coordinates centred on the camera).

According to a further embodiment, in the reference coordinate system, the boundary of the region of interest is static. For this embodiment, when a vessel carrying a camera translates through the water, the position and orientation of the region of interest in the image remains fixed But when the vessel rotates, the system applies a corresponding transformation to the region of interest in the image, so that any object within the region of interest at the start of the rotation, is maintained within the region of interest as the rotation progresses, for as long as it remains within the field of view of the camera.

In one embodiment, the two dimensional manifold is a sphere whose centre is located at the origin of the reference coordinate system and, in the reference coordinate system, the boundary of the region of interest is defined using a series of points located on the surface of the sphere. The series of points define a set of lines forming the boundary of the region of interest. Defining the region of interest in this manner provides an efficient basis for any transformations to account for changes in attitude. The boundary may be defined in terms of unit vectors. In a spherical coordinate system this means that only the angles of the vectors defining the boundary need be considered.

By defining a region of interest on a sphere in a reference coordinate system whose orientation with respect to the camera is known by virtue of the attitude sensor, the attitude of the camera may be accounted for whilst the region of interest continues to encompass the intended area. This allows a smaller region of interest to be used, thereby increasing the amount by which the image may be compressed whilst still ensuring the important sections of the image are represented with an acceptable fidelity. The transformation may utilise transformation matrices, such as direction cosine matrices, or quaternions.

According to an additional embodiment of the invention, the controller is configured to receive a reference image, attitude data for the reference image and data indicating the boundary of a region of interest within the reference image. The boundary of the region of interest in the reference coordinate system is defined by transforming the boundary of the region of interest in the reference image into the boundary of the region of interest in the reference coordinate system based on the attitude data for the reference image. In one embodiment, the transformation from the reference image is a transformation onto the two dimensional manifold in the reference coordinate system. This allows the region of interest to be conveniently defined in the coordinate system of the reference image, for instance, by the user drawing a boundary around an important section of the image. Subsequently the boundary of the region of interest in the reference coordinate system is mapped to a boundary in the image coordinate system according to the attitude data, thereby determining the section of the image within the region of interest and the section of the image outside the region of interest.

According to an embodiment, the region of interest in the reference coordinate system is defined based on a minimum and/or maximum threshold for elevation angle. In a further embodiment, the region of interest is defined to lie between a minimum and maximum threshold for elevation angle. This allows the region of interest to be set above and below the horizon to ensure that the horizon remains within the region of interest irrespective of the attitude of the camera.

According to a further embodiment, the region of interest in the reference coordinate system is defined based on a minimum and/or maximum threshold for azimuth angle. In a further embodiment, the region of interest is defined to lie between a minimum and maximum threshold for azimuth angle. This allows the region of interest to be set on either side of a direction of interest in the reference coordinate system to ensure that a path or object of interest remains within the region of interest irrespective of the attitude of the camera. Maximum and/or minimum angles for both elevation and azimuth may be defined. Where both maximum and minimum angles for azimuth and elevation are defined, the region of interest is set to a rectangle in the reference coordinate system.

Whilst the above embodiments discuss maximum and minimum angles with respect to the horizontal and north respectively, the threshold angles may equally be set with reference to any other axes provided these are fixed relative to the compass points and to the horizontal plane According to an embodiment, the image data comprises first and second images recorded by the camera, and the boundary of the region of interest in the second image is defined based on a transformation applied to the boundary of the region of interest in the first image. The transformation is based on the attitude data for the first and second images. This allows any change in the attitude of the camera to be accounted for so that the region of interest remains focussed on the relevant section of the second image.

The first and second images may form part of a video feed, with the position of the region of interest being updated for each image in the video feed in accordance with the attitude data for that image. Alternatively, the first and second images may be independent still images, with the first image forming a reference image in which the region of interest may be defined by the user. The first and second images may be received at the same time, for instance, when the whole video is transferred in one go, or separately, as in the case of streaming video. The first image may be compressed before the second image is received and/or compressed. Alternatively, the first and second images may be compressed in parallel.

According to one embodiment, the transformation compensates for a change in the attitude of the camera between the recording of the first image and the recording of the second image. This compensation keeps the region of interest fixed in a particular direction in reference coordinate space. The transformation may incorporate a magnification or other transformation to take into account any changes to the magnification applied to the image. Accordingly, where the magnification factor has changed between capturing the first and second images, the change in magnification may be incorporated into the transformation of the boundary of the region of interest.

According to a further embodiment, compressing each of the one or more images comprises partitioning the image into blocks, computing a discrete cosine transform for each block, and subsequently, quantising transform coefficients of the discrete cosine transform for each block. Applying a higher compression ratio to the section of the image outside the region of interest comprises applying a larger quantisation step size outside the region of interest than within the region of interest. Accordingly, the image may undergo transformation and quantisation compression with a smaller quantisation step size being applied to the transformed image data relating to the section of the image within region of interest. Alternatively, no quantisation may be applied within the region of interest.

In one embodiment, compressing the one or more images comprises, for each of the one or more images, applying transform compression to the image and wherein applying a higher compression ratio to the section of the image outside the region of interest comprises applying a different transformation to the section of the image outside the region of interest to the section of the image within the region of interest.

According to a second aspect of the invention there is provided a method of compressing image data. The method comprises receiving image data comprising one or more images recorded by a camera, receiving attitude data indicating the attitude of the camera when each of the one or more images was recorded, and, in each of the one or more images, defining a region of interest bounded by a boundary. The boundary of the region of interest is based on the attitude data for the respective image and defines a section of the image within the region of interest and a section of the image outside the region of interest. The method further comprises compressing each of the one or more images, wherein the compression ratio applied to the section of the image outside the region of interest is higher than that applied to the section of the image within the region of interest.

According to an embodiment, compressing each of the one or more images comprises, for each image, compressing only the section of the image outside the region of interest.

According to one embodiment, defining the region of interest in each of the one or more images comprises transforming the boundary of the region of interest defined in a reference coordinate system into a boundary of the region of interest within the respective image based on the attitude data for the image.

According to an embodiment, the reference coordinate system is concentric with the optical centre of the camera and is fixed with respect to compass points and with respect to the local horizontal plane.

According to one embodiment, the boundary of the region of interest is defined in the reference coordinate system on a two dimensional manifold which is carried by the reference coordinate system.

According to a further embodiment, on the manifold in the reference coordinate system, the boundary of the region of interest is static.

According to an embodiment, the two dimensional manifold is a sphere whose centre is located at the origin of the reference coordinate system and, in the reference coordinate system, the boundary of the region of interest is defined using a series of points located on the surface of the sphere.

According to one embodiment, the method further comprises receiving a reference image, attitude data for the reference image and data indicating the boundary of a region of interest within the reference image; and the boundary of the region of interest in the reference coordinate system is defined by transforming the boundary of the region of interest in the reference image into the boundary of the region of interest in the reference coordinate system based on the attitude data for the reference image.

According to one embodiment, the region of interest in the reference coordinate system is defined based on a minimum and/or maximum threshold for elevation angle.

According to a further embodiment, the region of interest in the reference coordinate system is defined based on a minimum and/or maximum threshold for azimuth angle According to a further embodiment, the image data comprises first and second images recorded by the camera; and the boundary of the region of interest in the second image is defined based on a transformation applied to the boundary of the region of interest in the first image, the transformation being based on the attitude data for the first and second images.

According to an embodiment, the transformation compensates for a change in the attitude of the camera between the recording of the first image and the recording of the second image.

According to an embodiment, compressing each of the one or more images comprises partitioning the image into blocks, computing a discrete cosine transform for each block, and subsequently, quantising the transform coefficients of the discrete cosine transform for each block. Applying a higher compression ratio to the section of the image outside the region of interest comprises applying a larger quantisation step size outside the region of interest than within the region of interest.

According to an additional embodiment, compressing each of the one or more images comprises, for each of the one or more images, applying transform compression to the image and applying a higher compression ratio to the section of the image outside the region of interest comprises applying a different transformation to the section of the image outside the region of interest to the section of the image within the region of interest.

Accordingly, embodiments of the invention allow a region of interest to be set within an image based on the attitude of the camera when the image was taken to compensate for camera motion. This allows a smaller region of interest to be defined than otherwise would have been possible in situations where a large amount of camera motion is expected. Accordingly, the image or images may be compressed by a larger amount without risking any loss of fidelity for the important sections of the recorded scene.

By defining a static region of interest on a sphere in a reference coordinate system which is fixed with respect to the horizontal plane and to the compass points, the region of interest can remain encompassing a particular direction whilst transformations from the reference coordinate space to the image coordinate space based on attitude data allow the boundaries of the region of interest in images taken at various attitudes to be determined.

Figure 1:
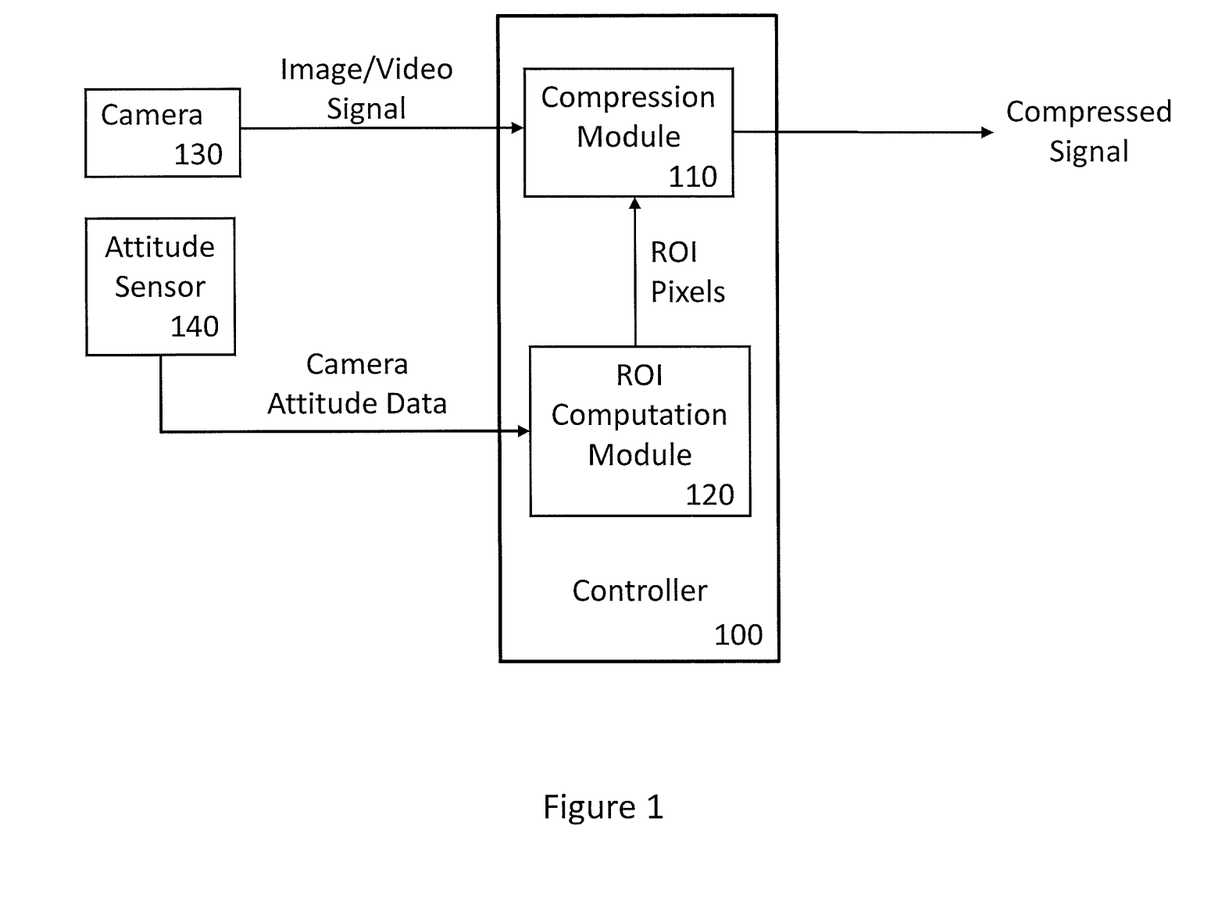
FIG. 1 shows a device for compressing image and/or video data according to an embodiment of the invention.

FIG. 1 shows a device for compressing image and/or video data according to an embodiment of the invention. The device comprises a controller 100 comprising a compression module 110 and a region of interest (ROI) computation module 120. The compression module 110 is configured to receive image and/or video data from a camera 130. The ROI computation module 120 is configured to receive attitude data from an attitude sensor 140. The camera attitude data provides information regarding the attitude of the camera 130. In one embodiment, the camera attitude data comprises data relating to the pitch, roll and yaw of the camera 130.

The ROI computation module 120 is configured to calculate a region of interest within the field of view of the image or video based on the camera attitude data. The region of interest is defined as a region within a boundary defined in the image. The boundary may be a polygon. This region defines the pixels or blocks of pixels which are to be compressed at a lower compression ratio.

The information identifying the ROI pixels is transferred to the compression module 110. If the attitude of the camera changes, the attitude sensor 140 detects this change and the ROI computation module 120 transforms the boundary of the region of interest to compensate for this change based on the camera attitude data. This means that the relevant area of the scene being viewed by the camera is kept within the region of interest (provided that it is still within the field of view of the camera).

The compression module 110 is configured to compress the image and/or video signal wherein a greater degree of compression is applied outside the region of interest than inside the region of interest. The compressed signal is then output. The compressed signal may be output to a transmitter to transmit to a remote operator, may be locally stored in memory or may be output via an alternative output device such as a display.

The controller 100 is integrated into a compression device, the camera 130 and attitude sensor 140 being external to the compression device, and the image/video signal and camera attitude data are received via an input interface in the compression device. In an alternative embodiment the controller is incorporated into the camera.

The attitude sensor 140 is attached to the camera 130. The attachment may be indirect by attaching the attitude sensor 140 to an object attached to the camera 130. In one embodiment, the camera 130 is located on a vehicle and the attitude data is provided by an attitude sensor incorporated within the vehicle. In an alternative embodiment, the attachment is direct, that is, having direct contact between the camera 130 and attitude sensor 140, e.g. by screwing the attitude sensor to the camera. In a further embodiment, the attitude sensor 140 is integrated within the camera 130.

Whilst the compression module 110 and the region of interest computation module 120 are shown to be integrated into one controller 100 in FIG. 1, in an alternative embodiment the compression module 110 and ROI computation module 120 are within separate controllers.

Transforming a region of interest based on attitude data is an effective and efficient method which ensures that the important sections of a region being imaged are maintained in high fidelity even in scenarios where there may be a large amount of camera movement, whilst still allowing less important sections of an image or video to be compressed to a greater degree thereby increasing compression ratio.

The attitude sensor 140 may measure the attitude of the camera itself or of an object to which the camera is attached, such as a vessel. The ROI computation module 120 is then configured to transform the ROI based on the attitude data relating to the attitude of the camera or other object.

Figure 2:
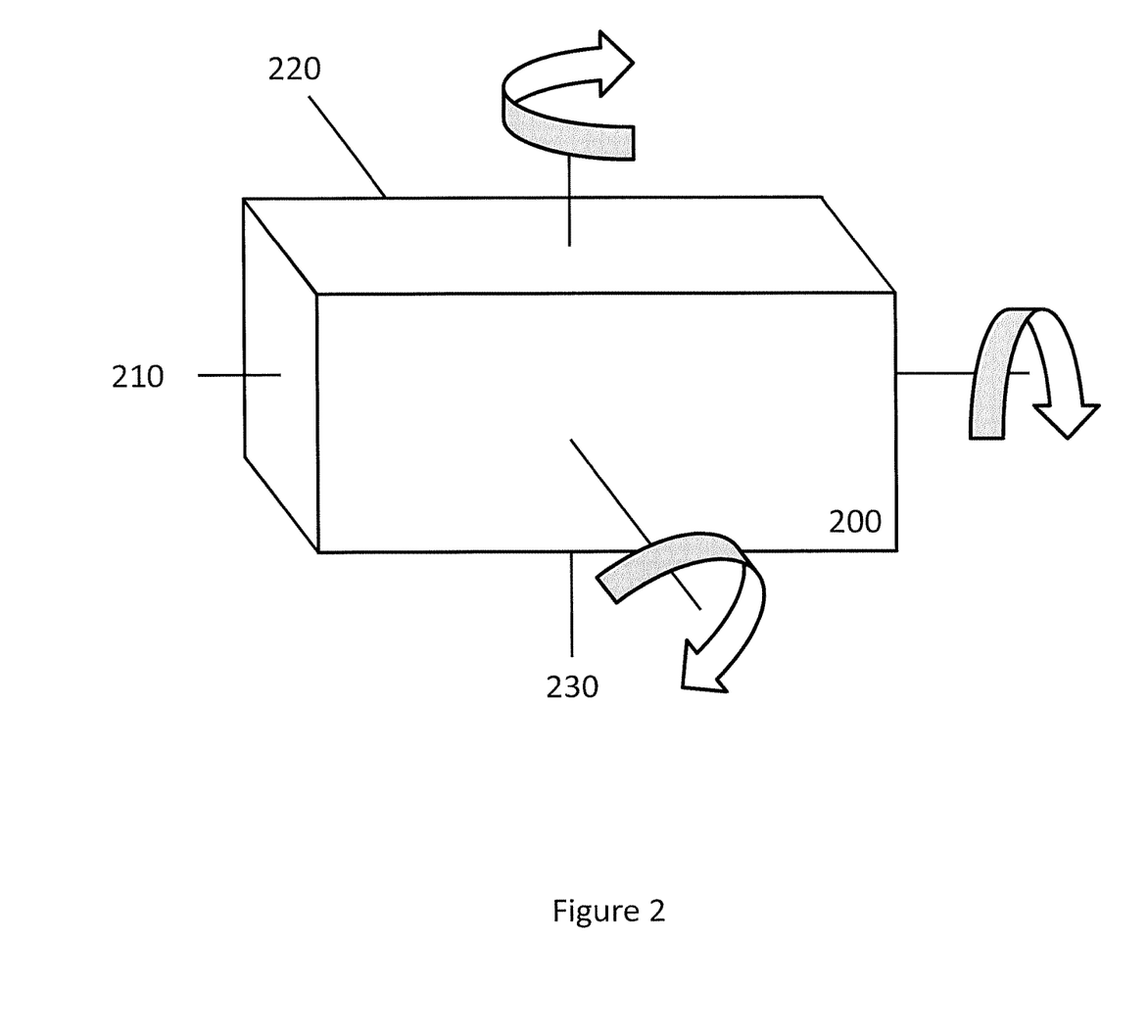
FIG. 2 depicts pitch, roll and yaw about an object.

Attitude can be described in terms of pitch, roll and yaw. FIG. 2 depicts pitch, roll and yaw pertaining to an object 200. With reference to the object 200, for instance a ship or a camera, pitch is the angle which the longitudinal axis 210 of the object 200 makes with the horizontal plane. It therefore represents a rotation about the lateral axis 220 of the object 200. Roll represents a rotation about the longitudinal axis 210 of the object 200. Yaw represents a rotation about the vertical axis 230 of the object 200.

Figure 3:
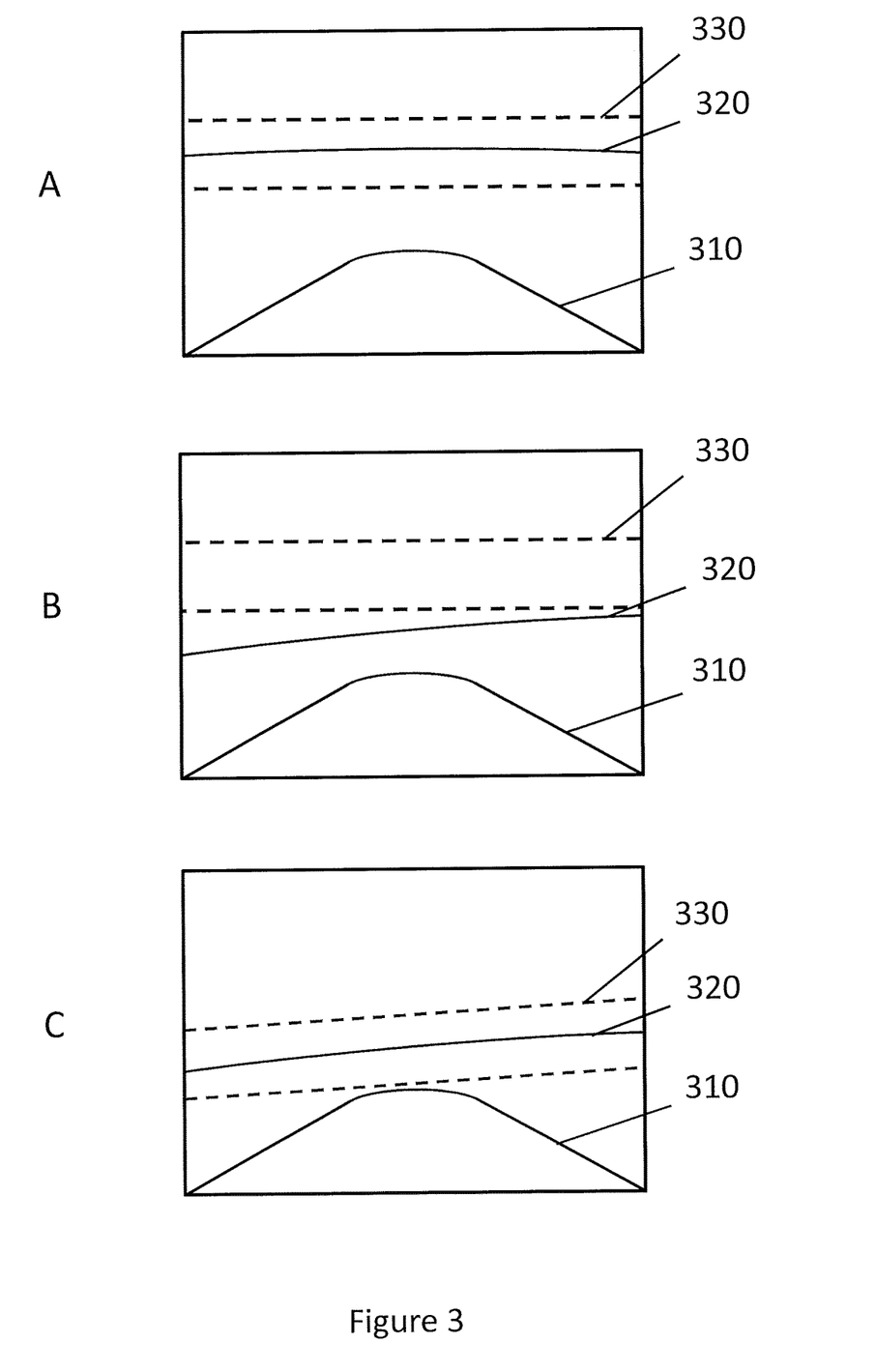
FIG. 3 shows three examples of images including a region of interest.

FIG. 3 shows three examples of images including a region of interest 330. FIGS. 3A, 3B and 3C represent the view from a camera mounted on the front of a ship. The bow of the ship 310 can be seen at the bottom of each image. As this region shows the ship itself it is not of particular interest to the user in the present example. As objects are most likely to appear on the horizon 320 this is the most important section of the image. Accordingly, the region of interest 330 is set to contain the horizon 320 within a rectangular area spanning the entire width of the image. This may be achieved by the initial or default position of the region of interest 330 being predefined, for instance via an input from the user. Alternatively, an initialisation process may be implemented utilising edge detection or shape recognition to focus the region of interest 330 on the desired area of the image (in this case the horizon 320).

FIG. 3B represents the view from a camera mounted on the front of a ship wherein the region of interest 330 is not transformed within the field of view of the camera to compensate for a change in attitude. In this example, the ship has pitched and rolled resulting in the horizon 320 moving out of the static region of interest 330. Accordingly, the horizon 320 is compressed at a higher level resulting in an unacceptable loss of fidelity at the horizon 320 whilst the region of interest 330 contains a high fidelity image of the sky which in this case is not useful to the user.

FIG. 3C shows the same view as FIG. 3B; however, in this case the region of interest 330 has been moved within the image according to an embodiment of the present invention to compensate for the change in attitude. The region of interest 330 is translated from its original position as shown in FIG. 3A to a second position, lower in the image, to compensate for the pitch of the ship. In addition, the region of interest 330 has undergone a rotation to accommodate for the roll of the ship. Without this rotation, the region of interest 330 would be centred on the horizon 320; however, it would not contain the full extent of the horizon 320 which, due to the roll of the ship, would pass out of the region of interest 330. The translation and rotation allow the region of interest 330 to track the horizon 320 as the ship pitches and rolls on the sea. This maintains a high fidelity image of the horizon 320, compensating for camera movement whilst allowing less important aspects of the image to be compressed to a higher degree to reduce the resulting image data volume.

The region of interest may be any shape or size. Its boundaries and initial position may be predefined based on settings stored in memory or may be defined by a user. In addition, the compression ratio, both inside and outside the region of interest, may be set by the user.

The region of interest may be moved based on any one of pitch, roll or yaw, or any combination of these parameters. In addition, as discussed below, non-linear transformations may be required, to account for the optics of the camera.

In one embodiment, the region of interest is defined within a boundary inscribed on the surface of a sphere, in a reference coordinate system co-centric with the camera 130. In the present embodiment the reference coordinate system has axes X, Y and Z parallel with East, North and Up respectively; however, any orientation may be utilised provided the sphere has a fixed orientation in relation to the compass points so that a specified point of the sphere always points north, along the horizontal (in practice, parallel to the surface of the earth at the specified location). Based on this defined boundary and the attitude data, the boundary of the region of interest within the image is determined via transformations of the boundary from the sphere to the image coordinate system.

Various embodiments arise as refinements in which different methods are used to specify the boundary of the region of interest on the sphere. In one embodiment the region of interest is defined based on elevation angle. In one embodiment, the region of interest is defined to lie between a lower and an upper elevation angle. This allows a region of interest to be defined around the horizon, as in FIG. 3C.

In another embodiment, the boundary is defined in terms of upper and lower limits for the azimuth angle with the region of interest lying therebetween. This may be useful for monitoring a particular direction of interest.

In another embodiment the operator defines maximum and minimum elevation angles but also defines minimum and maximum azimuth angles. This may be useful for defining a region of interest that emphasises a particular part of the horizon, such as that containing a stationary object in the far distance.

In further embodiments the region of interest is defined as a polygon on the sphere, with the shape being specified by the coordinates of its vertices.

In further embodiments the region of interest is defined as the region enclosed by a set of planes in the reference coordinate system.

The ROI computation module 120 is configured to find a set of pixels or blocks of pixels in the image that fall wholly or partly within the boundary, taking into account the attitude information from the attitude sensor 140.

Embodiments employ a method by which points on the sphere are represented within the reference coordinate system. In several embodiments, each point on the sphere is represented as a unit vector ($v_r$) in the reference coordinate system having coordinates $\{X, Y, Z\}$. These axes are fixed relative to the compass points. For example, the axes might align with [East, North, Up]. Similarly, embodiments require a representation by which each pixel in the image can be identified. In several embodiments {row, column} indices are used to identify the location of respective pixels in the image coordinate system.

In some embodiments, the ROI computation module 120 operates by constructing a list of vertices on the sphere that form the boundary of the region of interest, and for each such vertex, computing the corresponding {row, column} image coordinates. These points define a region in the image, and the ROI computation module 120 returns all pixels or blocks of pixels that lie within the region. This is achieved by transforming vectors for the vertices from the reference coordinate system into the image coordinate system.

To achieve the above, the ROI computation module is required to transform $\{X,Y,Z\}$ coordinates on the sphere, into {row, column} image coordinates. This transformation consists of a rotation that takes the vector from the reference coordinate system to the camera coordinate system, followed by a transformation that computes the row and column indices, this transformation being based on the characteristics of the camera.

FIGS. 4A-4D show a vessel 410 with a camera 420 mounted upon it and the various coordinate systems involved in the transformation from the reference coordinate system to the image coordinate system.

Figure 4A:
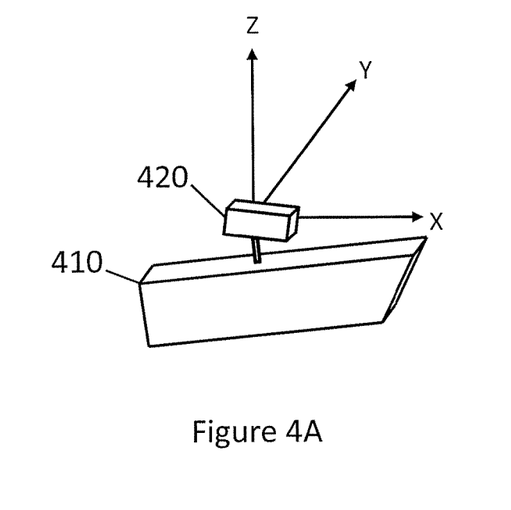
FIGS. 4A-4D show a vessel 410 with a camera 420 mounted upon it and the various coordinate systems involved in the transformation from the reference coordinate system to the image coordinate system.

FIG. 4A shows the reference coordinate system having axes X, Y and Z and which is centred on the optical centre of the camera 410.

Figure 4B:
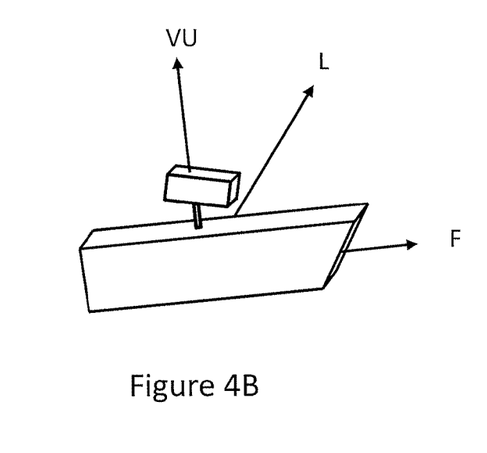

The first transformation required is a transformation to account for the attitude of the vessel 410. This is a transformation from the reference coordinate system to an attitude coordinate system. The attitude coordinate system shown in FIG. 4B is aligned with the attitude of the boat 420. Accordingly, the attitude coordinate system is a vessel coordinate system. In this embodiment, the vessel coordinate system comprises Forward, Left and VesselUp (F, L, VU) coordinates.

Figure 4C:
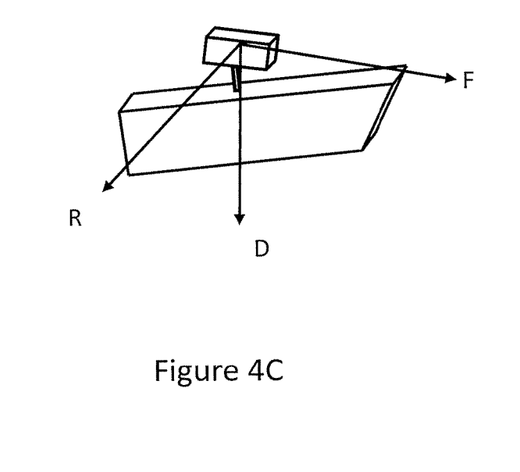

The attitude coordinate system is the coordinate system of the attitude sensor. Accordingly, in the present embodiment it is necessary to transform this coordinate system into a coordinate system which is aligned with the camera. The camera coordinate system is shown in FIG. 4C. The camera coordinate system comprises right, down and forward (R, D and F) coordinates.

Figure 4D:
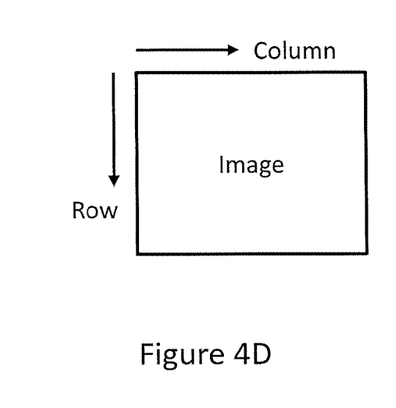

Finally, a transformation is required to convert the camera coordinate system into a two dimensional image coordinate system. This transformation accounts for the optical properties of the camera to provide a coordinate system which can represents pixel coordinates in an image. The image coordinate system is shown in FIG. 4D and comprises row (R) and column (C) indices. As a convention, the row coordinates are smallest at the top of the image and therefore run from the top to the bottom of the image.

In one embodiment, the attitude sensor is attached to the vessel so that its pitch, roll and yaw outputs are the pitch, roll and yaw of the vessel itself. The ROI computation module 120 receives the pitch, roll and yaw angles from the attitude sensor 140 and these are used to compute a direction cosine matrix denoted $M_r^v$ that transforms vectors from the reference coordinate system into the vessel coordinate system. The camera has a fixed orientation with respect to the vessel, and this orientation is represented by a second direction cosine matrix (DCM), denoted $M_v^c$, that transforms vectors from the vessel coordinate system into vectors in the camera coordinate system. Vectors in the reference coordinate system are constrained to be unit vectors, and since the direction cosine matrices preserve this property, the resulting vectors in the camera coordinate system are unit vectors also.

In mathematical notation these steps are written as follows, for an embodiment in which the reference coordinate system has axes {X, Y, Z}. Let the yaw, also known as the heading, be denoted $\alpha$, so that the vessel points due North when $\alpha=0$. Let the pitch angle $\beta$ be defined such that positive pitch raises the bow. Let the roll angle $\gamma$ be defined such that positive roll rotates the mast to the starboard. Let the unit vector in the reference coordinate system be $v_r$, and let the vector in camera coordinate system be $v_c$. Then the direction cosine matrix $M_r^v$ is given by $$M_r^v = \begin{bmatrix} -\text{Cos}[\beta] & \text{Cos}[\alpha]\text{Cos}[\gamma] - & \text{Cos}[\gamma]\text{Sin}[\alpha]\text{Sin}[\beta] + \\ \text{Sin}[\alpha] & \text{Sin}[\alpha]\text{Sin}[\beta]\text{Sin}[\gamma] & \text{Cos}[\alpha]\text{Sin}[\gamma] \\ -\text{Cos}[\alpha] & -\text{Cos}[\gamma]\text{Sin}[\alpha] - & \text{Cos}[\alpha]\text{Cos}[\gamma]\text{Sin}[\beta] - \\ \text{Cos}[\beta] & \text{Cos}[\alpha]\text{Sin}[\beta]\text{Sin}[\gamma] & \text{Sin}[\alpha]\text{Sin}[\gamma] \\ \text{Sin}[\beta] & -\text{Cos}[\beta]\text{Sin}[\gamma] & \text{Cos}[\beta]\text{Cos}[\gamma] \end{bmatrix}$$

The rotation from the reference coordinate system to the camera coordinate system is $$v_c = M_v^c M_r^v v_r$$

Finally, this latter vector $v_c$ is transformed into a vector in image coordinates, this being denoted $v_i$ and comprising row and column indices indicating the corresponding pixel within the image. This transformation being based on the characteristics of the camera: its focal length (f), horizontal and vertical angular extent, and the number of pixels horizontally and vertically. Namely:

$$\text{row} = \frac{fD}{dF} + r_0 \quad \text{column} = \frac{fR}{dF} + c_0$$

where d is the pixel density, $r_0$ and $c_0$ are the row and column coordinates for the optical centre of the image and R, D and F are the right, down and forward coordinates from the camera coordinate system respectively.

The general definition of a direction cosine matrix (DCM) between two sets of three dimensional coordinates is:

$$DCM = \begin{pmatrix} \cos\theta_{x_1,x_2} & \cos\theta_{x_1,y_2} & \cos\theta_{x_1,z_2} \\ \cos\theta_{y_1,x_2} & \cos\theta_{y_1,y_2} & \cos\theta_{y_1,z_2} \\ \cos\theta_{z_1,x_2} & \cos\theta_{z_1,y_2} & \cos\theta_{z_1,z_2} \end{pmatrix}$$

where $x_1$, $y_1$, $z_1$ are the coordinate vectors for the first coordinate set, $x_2$, $y_2$, $z_2$ are the coordinate vectors for the second coordinate set and $\theta_{ab}$ is the angle between vectors a and b.

Various embodiments arise as refinements in which different methods are used to make the transformation from the reference coordinate system to the camera coordinate system. The reference, attitude/vessel and camera coordinate systems are shown as Cartesian coordinate systems but may well be implemented as polar coordinate systems. The arrangement of the coordinate systems in FIGS. 4A-D is shown as an example. Accordingly, any reference coordinate system may be used provided that it is fixed with respect to the poles of the compass and the vertical and its origin is static with respect to the camera 420. The attitude sensor need not be attached directly to the vessel but to any object whose orientation with respect to the camera is known, and in this case the vessel coordinate system may be replaced with a separate sensor coordinate system. Any camera coordinate system may be used provided that it is aligned with and concentric with, the camera. Any image coordinate system may be used provided that it represents the location of points within an image produced by the camera. Whilst the above embodiments describe the relationship of the camera attitude to the attitude sensor attitude via a vessel coordinate system, this transformation is not necessary and may be avoided in favour of a direct transformation from the attitude coordinate system to the camera coordinate system. Accordingly, instead of transforming from the reference coordinate system to the camera coordinate system via a vessel coordinate system, in one embodiment a direct transformation from the reference coordinate system to the camera coordinate system is implemented.

The transformation matrix $M_v^c$ may be predefined and stored in memory, may be user defined, or may be determined by the system itself. The direction cosine matrix $M_r^v$ is calculated by the system based on the attitude data.

Based on the above methods, the region of interest may be defined as a static region on a sphere in the reference coordinate system so that it remains fixed encompassing a particular direction of interest. The attitude data is then used to determine the required transformation matrices (as discussed above) to determine which pixels in the image fall within the region of interest. By applying the required transformation matrices to the vectors for the boundary of the region of interest in the reference coordinate system, the region of interest may be defined in the image coordinate system. As the transformation varies based on the attitude data, the position of the region of interest within the image is varied to account for any change in attitude.

In another embodiment, the region of interest is defined between maximum and minimum boundaries for the elevation angle. Maximum and minimum azimuth angles may also be set. Information from the attitude sensor 140 is then used to determine a DCM that defines the orientation of the attitude sensor 140, and thence into a DCM that defines the attitude of the camera 130 in the reference coordinate system. From this, geometric transformations yield a definition of the lines representing the upper and lower boundaries of the region, expressed in pixel coordinates. This allows the region of interest to be defined based on boundaries above and below the horizon so that horizon remains within the region of interest, or based on a box encompassing an object of interest.

In further embodiments only partial attitude information is available, such as yaw only or yaw and pitch only. In these cases the transformations may be simplified while retaining the intent of mapping a region of interest on the surface of a sphere in the reference coordinate system to the image.

In a further embodiment the region of interest is defined within a boundary defined in the image coordinate system and the system infers a corresponding boundary on the sphere in the reference coordinate system. In a specific embodiment, the operator draws a boundary around an object in an image. This provides the boundary for the region of interest in the image coordinate system. The inverse of the transformations to transform from the reference coordinate system to the image coordinate system are used to determine the boundary coordinates of the region of interest on the sphere. The boundary coordinates on the sphere in the reference coordinate system are used, so that a transformation into the image coordinate system for a subsequent image may account for any change in the attitude of the camera.

Other means of using attitude data to determine a position or region in an image are available. For instance, as an alternative to direction cosine matrices, a quaternion representation can be used to transform reference coordinates to coordinates in the image with equivalent effect.

FIG. 3 relates to single images. Embodiments of the present invention can be applied to a single image taken when the attitude of the camera, or another object connected to the camera, is known. Embodiments of the present invention may also be applied to compressing video data. Video data can be considered as a stream of consecutive images, called frames. The amount of compression may be changed via various methods, each depending on the type of compression which is employed. Whilst embodiments of the present invention may utilise various means of compression, in one embodiment the data to be compressed is video data and the method of compression complies with the H.264 standard.

Figure 5:
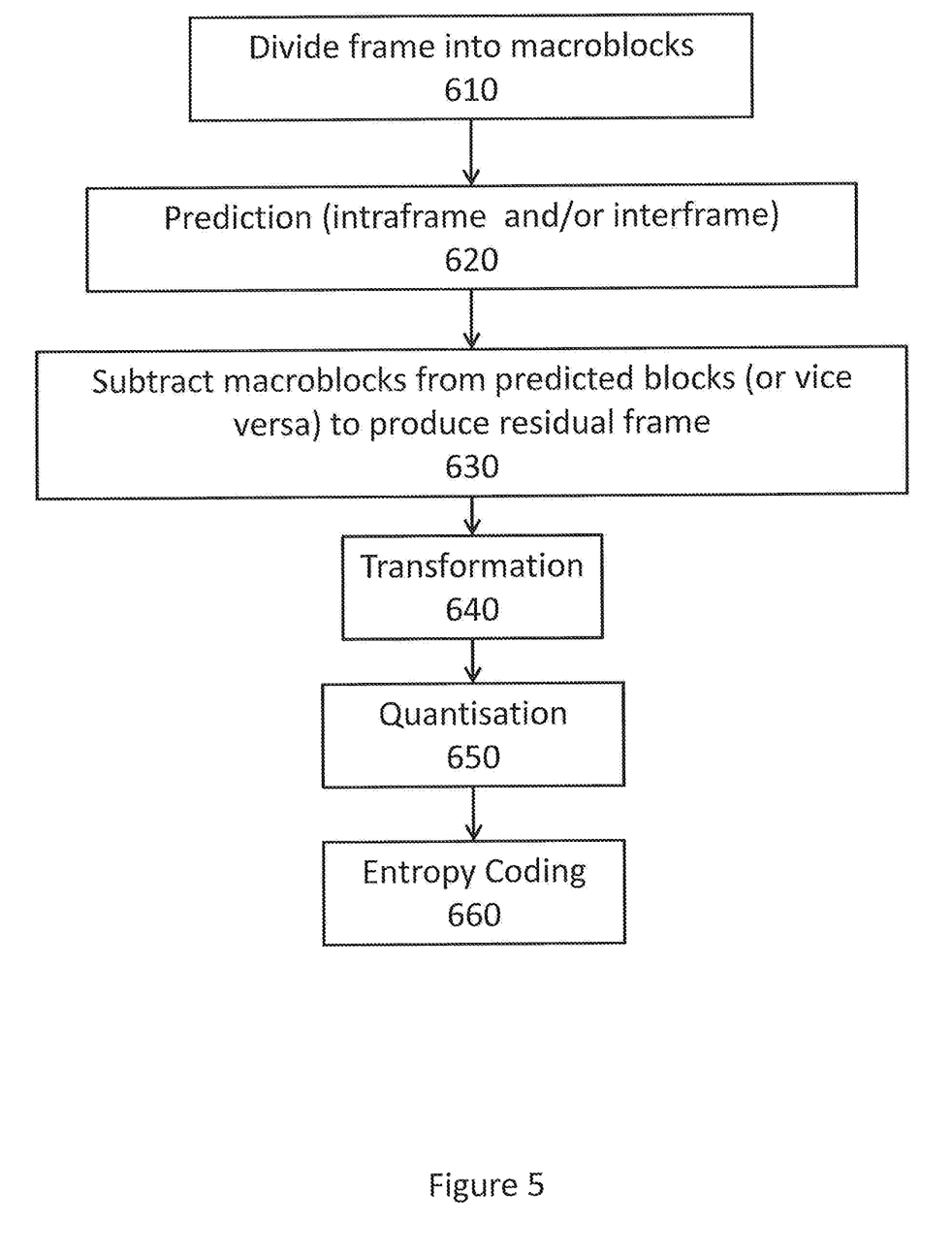
FIG. 5 shows a method of compressing a frame of video data.

FIG. 5 shows a method of compressing a frame of video data based on H.264. Compression is obtained in part through prediction. The frame is first divided 610 up into blocks of pixels called macroblocks. The content of a macroblock may be predicted 620 based on information within the same frame (intraframe prediction) and/or information in one or more other frames in the video sequence (interframe prediction), for instance the preceding frame and/or the frame immediately following the current frame.

Intraframe prediction relies on spatial redundancy. The pixels within a macroblock are predicted based on the pixels adjacent to the macroblock. Usually, the pixels running along the left hand side and the top of the macroblock are used. As the prediction is not perfect, the predicted block is subtracted 630 from the original macroblock (or vice versa) to produce a residual macroblock. A residual macroblock shows the error produced by the prediction. Each original macroblock can then be reconstructed (decompressed) using the data used for the prediction and the residual macroblock. The compression results from the reduction in the number of bits that are required to transmit the pixels used for prediction and the residual macroblock.

Interframe prediction makes use of temporal redundancy. As mentioned above, interframe prediction compresses a given frame using one or more preceding and/or succeeding frames in the video as reference frames. Usually, only neighbouring frames are used as reference frames (i.e. the frame immediately preceding and/or the frame immediately following the frame being compressed).

One example of interframe compression is block based motion compensation. As in intraframe prediction, the frame being compressed is divided up into macroblocks. For each macroblock, the preceding frame is searched using a block matching algorithm to find a block in the preceding frame which is similar to said macroblock. If such a matching block is found, a motion vector is computed giving the direction and magnitude of the offset between the position of the matching block in the reference frame and the position of the macroblock being compressed in the present frame. The predicted macroblock is subtracted from the frame being compressed (or vice versa) in order to produce a residual macroblock showing the errors in the prediction. A video decoder is able to reconstruct the original macroblock once it has received and decoded the predicted macroblock, as well as the motion vectors and the residual macroblock. In addition to using the preceding frame as a reference frame, the frame immediately following the frame being compressed may also be used as a reference frame. The reference frames themselves may be compressed via intraframe predication.

Motion compensation utilising large macroblocks reduces the number of data vectors required but can increase the number of bits needed to encode the residual macroblocks, as using larger blocks can result in greater error in the predicted frames. In comparison, using smaller macroblocks means that there is a greater chance that a closely matching block can be found in the reference frame, thereby reducing the number of bits required to encode the residual macroblock, but increases the number of motion vectors required.

The size of macroblocks may either be predefined, or may be determined based on the content of the picture. For instance, some compression methods allow variable macroblock size, where the size of the macroblock is chosen dependent on the local complexity. One method begins with a large macroblock for a region and splits the macroblock into a number of smaller macroblocks. This gives rise to improved compression for a given error requirement. The macroblocks are repeatedly split until either a block is located within the reference frame which matches the block to within an allowable error or a minimum block size is reached.

The above prediction methods are lossless, provided the residual blocks are encoded without error; however, greater compression can be achieved at the expense of information via transformation and quantisation, as will be explained later.

A transformation 640, such as a discrete cosine transformation, is applied to each residual macroblock. The discrete cosine transform describes the information within the macroblock in terms of cosines of various frequencies. This allows effective compression as, for most images, the majority of the signal energy lies at low frequencies. The high frequencies usually have small enough amplitudes that they may be neglected with little visible distortion. Accordingly, by separating the signal into its respective frequencies, precision at higher frequencies can be reduced via quantisation, resulting in a compressed signal with little signal degradation.

As an alternative to the direct cosine transform, H.264 applies a modified transform, based on the discrete cosine transform, with a transform matrix H of:

$$H = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

applied to 4×4 blocks within the residual macroblock. This achieves the same function as the direct cosine transform; however, it has integer coefficients and is therefore less susceptible to rounding errors than the direct cosine transform, which has irrational coefficients.

The coefficients of the transformed macroblocks are quantised 650. Quantisation involves representing a range of values as a single integer value. By applying this across the set of transform coefficients, the resulting signal can be described by a reduced number of discrete symbols thereby resulting in a more compressed signal.

Quantisation of the transformed macroblocks reduces the number of values required to represent the original signal, thereby achieving compression. In addition, the coefficients for higher frequencies are often quantised to zero, and this enables improved entropy coding (see below). In general, entropy coding benefits whenever the distribution is concentrated in a smaller number of values and this is achieved via a quantisation step that leads to many values being zero.

In one embodiment, quantisation 650 involves dividing the transform coefficient matrix by a predefined quantisation matrix. The quantisation matrix is designed to provide greater resolution to more perceivable frequency components over less perceivable components. Generally, this means that the quantisation matrix has higher values corresponding to higher frequency components than those corresponding to lower frequency components. The transform coefficient matrix (comprising the coefficients of the transformed block) is divided by the quantisation matrix and the resulting values are rounded to their nearest integers. The compression ratio can be varied by changing the quantisation matrix. Increasing the values in the quantisation matrix increases the quantisation step size and therefore increases compression.

Following quantisation, the quantised coefficients undergo entropy coding 660 to describe the data in a more efficient way. Entropy coding methods are generally lossless data compression schemes where shorter codewords are assigned to the most common input values than to the rare input values. Various methods of entropy coding are available, such as Huffman coding, Golomb coding or context-adaptive variable-length coding.

The resulting compressed signal can then be stored in memory or transmitted to a decoder so that it may be decompressed. Decompression involves decoding the entropy encoded signal to reproduce the quantised signal. The quantisation is reversed by multiplying the quantised values by the corresponding quantisation parameters (applying the inverse of the quantisation matrix). The discrete cosine transform (or the modified transform) is reversed by applying the inverse of the relevant transform. This provides a decoded residual macroblock which can be used, along with the data required for prediction, to recover the original macroblock.

According to an embodiment of the invention, the method of compression involves compressing the section of the image outside of the region of interest but not compressing the section of the image inside the region of interest. Accordingly, one or more of the above compression methods may be applied only to the section of the image outside of the region of interest.

In a further embodiment, a smaller degree of compression is applied to the section of the image inside the region of interest than to the section of the image outside the region of interest. In one embodiment, this involves applying more compression steps to the section of the image outside the region of interest than to the section of the image inside the region of interest.

In a further embodiment, the section of the image inside the region of interest does not undergo quantisation whereas the section of the image outside the region of interest does undergo quantisation.

In further embodiments, other compression methods, such as those discussed above or alternative methods known in the art, are implemented in the section of the image outside the region of interest and not in the section of the image inside the region of interest.

In a further embodiment, the same method of compression is applied to the region of interest as outside the region of interest; however, a higher compression ratio is applied outside the region of interest. In one embodiment, the transform coefficients are quantised and a finer quantisation step size is applied to the section of the image within the region of interest than to the section of the image outside the region of interest.

In a further embodiment, transform compression is applied to the image and a different transform is applied to the section of the image inside the region of interest than to the section of the image outside the region of interest.

The above methods of compression may be implemented either in hardware or via software executed in a controller.

Figure 6:
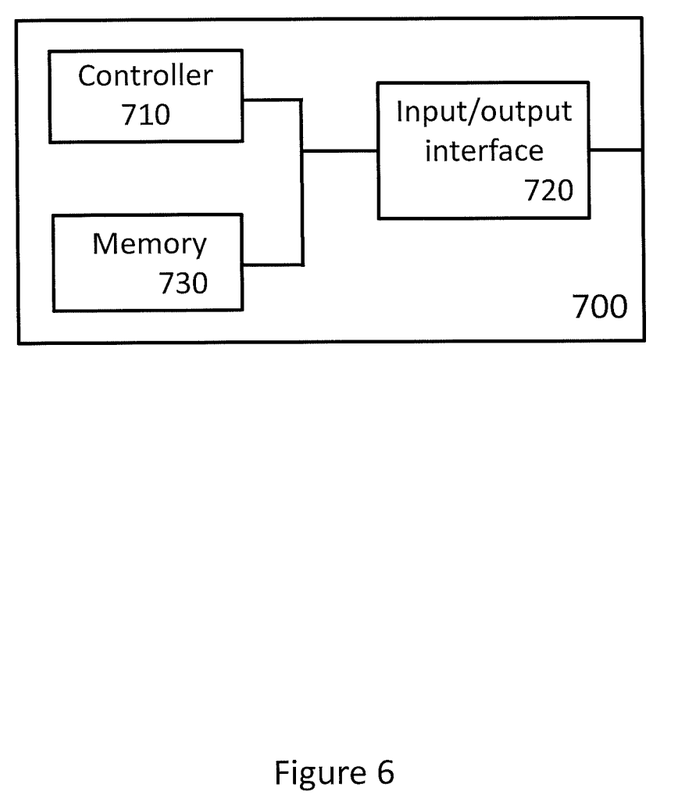
FIG. 6 shows a further device for compressing image and/or video data according to an embodiment of the invention.

FIG. 6 shows a further device 700 for compressing image and/or video data according to an embodiment of the invention. The device 700 comprises a controller 710 for compressing image and video signals and an input/output interface 720 for receiving input signals and outputting output signals. The controller executes its functions based on executable software code stored in memory 730. The controller 710 comprises the ROI computation module 120 and the compression module 110, although these may be implemented in separate controllers in an alternative embodiment. In one embodiment, the device 700 is incorporated into a video encoder unit.

While certain embodiments have been described, the embodiments have been presented by way of example only, and are not intended to limit the scope of the inventions. For instance, whilst embodiments are described with reference to unmanned surface vehicles, embodiments of the invention may equally be applied to video feeds from manned ships, and to ground vehicles, aircraft or any other application in which a camera's region of interest is likely to vary with attitude.

Furthermore, whilst specific examples of methods of compression are described (for instance, applying quantisation matrices, entropy coding, etc.) embodiments of the present invention may equally be applied to any method of compression, provided that the position of the region of interest is defined based on attitude data so that camera movement may be accounted for.

In addition, whilst embodiments of the invention relate to applying a lower compression to a section of the image within the region of interest, this also includes applying no compression to the section of the image within the region of interest whilst compression the section of the image outside the region of interest.

Indeed, the novel methods, apparatus and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A non-transitory computer-readable medium comprising a control program configured to cause, when executed by a device suitable for compressing image data relating to images taken in low light conditions, the device to execute:
   receiving image data comprising one or more images recorded by a camera;
   receiving attitude data indicating the attitude of the camera when each of the one or more images was recorded;
   in each of the one or more images, defining a region of interest bounded by a boundary, the boundary of the region of interest being based on the attitude data for the respective image and defining a section of the image within the region of interest and a section of the image outside the region of interest, the boundary of the region of interest being defined in a reference coordinate system on a two dimensional manifold which is carried by the reference coordinate system,
      wherein an origin of the reference coordinate system is centered on the optical center of the camera,
      wherein the two dimensional manifold is a sphere whose center is located at the origin of the reference coordinate system, and
      wherein, in the reference coordinate system, the boundary of the region of interest is defined using a series of points located on the surface of the sphere; and
   compressing each of the one or more images, wherein the compression ratio applied to the section of the image outside the region of interest is higher than that applied to the section of the image within the region of interest,
   wherein defining the region of interest in each of the one or more images comprises transforming the boundary of the region of interest defined in the reference coordinate system into the boundary of the region of interest within the respective image based on the attitude data for the image to compensate for any change in camera attitude.

2. The non-transitory computer-readable medium of claim 1, wherein said compressing each of the one or more images comprises compressing, for each image, only the section of the image outside the region of interest.

3. The non-transitory computer-readable medium of claim 1, wherein the reference coordinate system is concentric with the optical center of the camera and is fixed with respect to compass points and with respect to the local horizontal plane.

4. The non-transitory computer-readable medium of claim 1, wherein, on the manifold in the reference coordinate system, the boundary of the region of interest is static.

5. The non-transitory computer-readable medium of claim 1, wherein:
   the control program is configured to cause the device to receive a reference image, attitude data for the reference image and data indicating the boundary of a region of interest within the reference image; and
   the boundary of the region of interest in the reference coordinate system is defined by transforming the boundary of the region of interest in the reference image into the boundary of the region of interest in the reference coordinate system based on the attitude data for the reference image.

6. The non-transitory computer-readable medium of claim 1, wherein the region of interest in the reference coordinate system is defined based on a minimum and/or maximum threshold for elevation angle.

7. The non-transitory computer-readable medium of claim 1, wherein:
   the image data comprises first and second images recorded by the camera; and
   the boundary of the region of interest in the second image is defined based on a transformation applied to the boundary of the region of interest in the first image, the transformation being based on the attitude data for the first and second images.

8. The non-transitory computer-readable medium of claim 7, wherein the transformation compensates for a change in the attitude of the camera between the recording of the first image and the recording of the second image.

9. A method of compressing image data, the method comprising:
   receiving image data comprising one or more images recorded by a camera;
   receiving attitude data indicating the attitude of the camera when each of the one or more images was recorded;
   in each of the one or more images, defining a region of interest bounded by a boundary, the boundary of the region of interest being based on the attitude data for the respective image and defining a section of the image within the region of interest and a section of the image outside the region of interest, the boundary of the region of interest being defined in the reference coordinate system on a two dimensional manifold which is carried by the reference coordinate system,
      wherein the origin of the reference coordinate system is centered on the optical center of the camera,
      wherein the two dimensional manifold is a sphere whose center is located at the origin of the reference coordinate system, and
      wherein, in the reference coordinate system, the boundary of the region of interest is defined using a series of points located on the surface of the sphere; and
   compressing each of the one or more images, wherein the compression ratio applied to the section of the image outside the region of interest is higher than that applied to the section of the image within the region of interest,
   wherein defining the region of interest in each of the one or more images comprises transforming the boundary of the region of interest defined in the reference coordinate system into the boundary of the region of interest within the respective image based on the attitude data for the image to compensate for any change in camera attitude.

10. The method according to claim 9, wherein said compressing each of the one or more images comprises, for each image, compressing only the section of the image outside the region of interest.

11. The method according to claim 9, wherein the reference coordinate system is concentric with the optical center of the camera and is fixed with respect to compass points and with respect to the local horizontal plane.

12. The method according to claim 9, wherein, on the manifold in the reference coordinate system, the boundary of the region of interest is static.

13. The method according to claim 9, wherein:
the method further comprises receiving a reference image, attitude data for the reference image and data indicating the boundary of a region of interest within the reference image; and
the boundary of the region of interest in the reference coordinate system is defined by transforming the boundary of the region of interest in the reference image into the boundary of the region of interest in the reference coordinate system based on the attitude data for the reference image.

14. The method according to claim 9, wherein the region of interest in the reference coordinate system is defined based on a minimum and/or maximum threshold for elevation angle.

15. The non-transitory computer-readable medium of claim 1, wherein the region of interest in the reference coordinate system is defined based on a minimum and/or maximum threshold for azimuth angle.

16. The method according to claim 9, wherein the region of interest in the reference coordinate system is defined based on a minimum and/or maximum threshold for azimuth angle.

* * * * *